(12) United States Patent
Iaciofano et al.

(10) Patent No.: US 11,555,563 B2
(45) Date of Patent: Jan. 17, 2023

(54) LAYER AND TUBE COMPRISING SUCH A LAYER

(71) Applicant: EXEL INDUSTRIES, Epernay (FR)

(72) Inventors: Nick Iaciofano, Paris (FR); David Lord, Paris (FR)

(73) Assignee: TELEBRANDS CORP., Fairfield, NJ (US)

( * ) Notice: Subject to any disclaimer, the term of this patent is extended or adjusted under 35 U.S.C. 154(b) by 242 days.

(21) Appl. No.: 16/634,789

(22) PCT Filed: Jul. 30, 2018

(86) PCT No.: PCT/EP2018/070560
§ 371 (c)(1),
(2) Date: Jan. 28, 2020

(87) PCT Pub. No.: WO2019/025347
PCT Pub. Date: Feb. 7, 2019

(65) Prior Publication Data
US 2020/0208759 A1    Jul. 2, 2020

(30) Foreign Application Priority Data

Jul. 31, 2017  (FR) ..................................... 1757308

(51) Int. Cl.
*F16L 11/12*       (2006.01)
*D03D 3/02*        (2006.01)
*D03D 15/56*       (2021.01)
*D03D 1/00*        (2006.01)

(52) U.S. Cl.
CPC ............ *F16L 11/12* (2013.01); *D03D 1/0043* (2021.05); *D03D 3/02* (2013.01); *D03D 15/56* (2021.01); *B32B 2597/00* (2013.01); *D10B 2331/04* (2013.01); *D10B 2401/061* (2013.01)

(58) Field of Classification Search
CPC ............ F16L 11/00; F16L 11/12; F16L 57/06; D03D 13/004; D03D 1/0043; D03D 17/00; H02G 15/18
USPC ....... 138/110, 119, 118, 123; 428/36.1, 36.3, 428/34.5, 34.9, 99
See application file for complete search history.

(56) References Cited

U.S. PATENT DOCUMENTS 3,669,157 A  *  6/1972  Woodall, Jr. ........ B29C 61/0658
                                                   28/142
4,478,661 A  *  10/1984  Lewis ................. B29C 66/4322
                                                   138/119

(Continued)

FOREIGN PATENT DOCUMENTS

CA         2066813 C      3/1997
CN       202769095 U      3/2013
(Continued)

OTHER PUBLICATIONS

Search Report from French Patent Office dated Apr. 12, 2018.
(Continued)

*Primary Examiner* — Patrick F Brinson
(74) *Attorney, Agent, or Firm* — Heslin Rothenberg Farley & Mesiti P.C.; Victor A. Cardona, Esq.

(57) ABSTRACT

A sleeve for the construction of a hose pipe extends about a longitudinal axis. The sleeve has greater elongation capacities in one direction than in the other with respect to the longitudinal axis.

15 Claims, 5 Drawing Sheets

(56) References Cited

U.S. PATENT DOCUMENTS

| | | | | |
|---|---|---|---|---|
| 4,862,922 | A * | 9/1989 | Kite, III | D04C 1/06 |
| | | | | 174/136 |
| 5,413,149 | A * | 5/1995 | Ford | F16L 57/06 |
| | | | | 428/36.1 |
| 6,045,884 | A * | 4/2000 | Hess | D03D 15/267 |
| | | | | 428/36.1 |
| 6,523,539 | B2 * | 2/2003 | McDonald | A62B 25/005 |
| | | | | 128/205.25 |
| 7,013,929 | B2 * | 3/2006 | Laurent | F16L 59/021 |
| | | | | 138/123 |
| 7,085,455 | B2 * | 8/2006 | Morris | G02B 6/508 |
| | | | | 385/100 |
| 7,216,678 | B2 * | 5/2007 | Baer | D03D 3/08 |
| | | | | 139/390 |
| 7,549,448 | B2 * | 6/2009 | Ragner | F16L 11/118 |
| | | | | 239/196 |
| 8,479,776 | B2 * | 7/2013 | Berardi | F16L 11/00 |
| | | | | 138/119 |
| 8,701,716 | B2 * | 4/2014 | Kashihara | D03D 13/004 |
| | | | | 139/384 R |
| 8,925,592 | B2 * | 1/2015 | Itoh | D03D 3/08 |
| | | | | 138/123 |
| 9,841,127 | B2 * | 12/2017 | Berardi | F16L 11/00 |
| 9,964,239 | B2 * | 5/2018 | Disbrow | F16L 11/12 |
| 2002/0161388 | A1 * | 10/2002 | Samuels | A61M 25/10 |
| | | | | 428/36.9 |
| 2015/0061281 | A1 | 3/2015 | Huang | |

FOREIGN PATENT DOCUMENTS

| | | |
|---|---|---|
| CN | 204345104 U | 5/2015 |
| DE | 202014004448 U1 | 6/2014 |
| DE | 202014004448 U1 | 7/2014 |
| EP | 0510784 A1 | 10/1992 |
| WO | 2016098063 A1 | 6/2016 |

OTHER PUBLICATIONS

Chinese Search Report dated Mar. 16, 2021.
International Search Report (and English translation) and Written Opinion of the International Searching Authority for International Application No. PCT/EP2018/070560 dated Oct. 12, 2018.

* cited by examiner

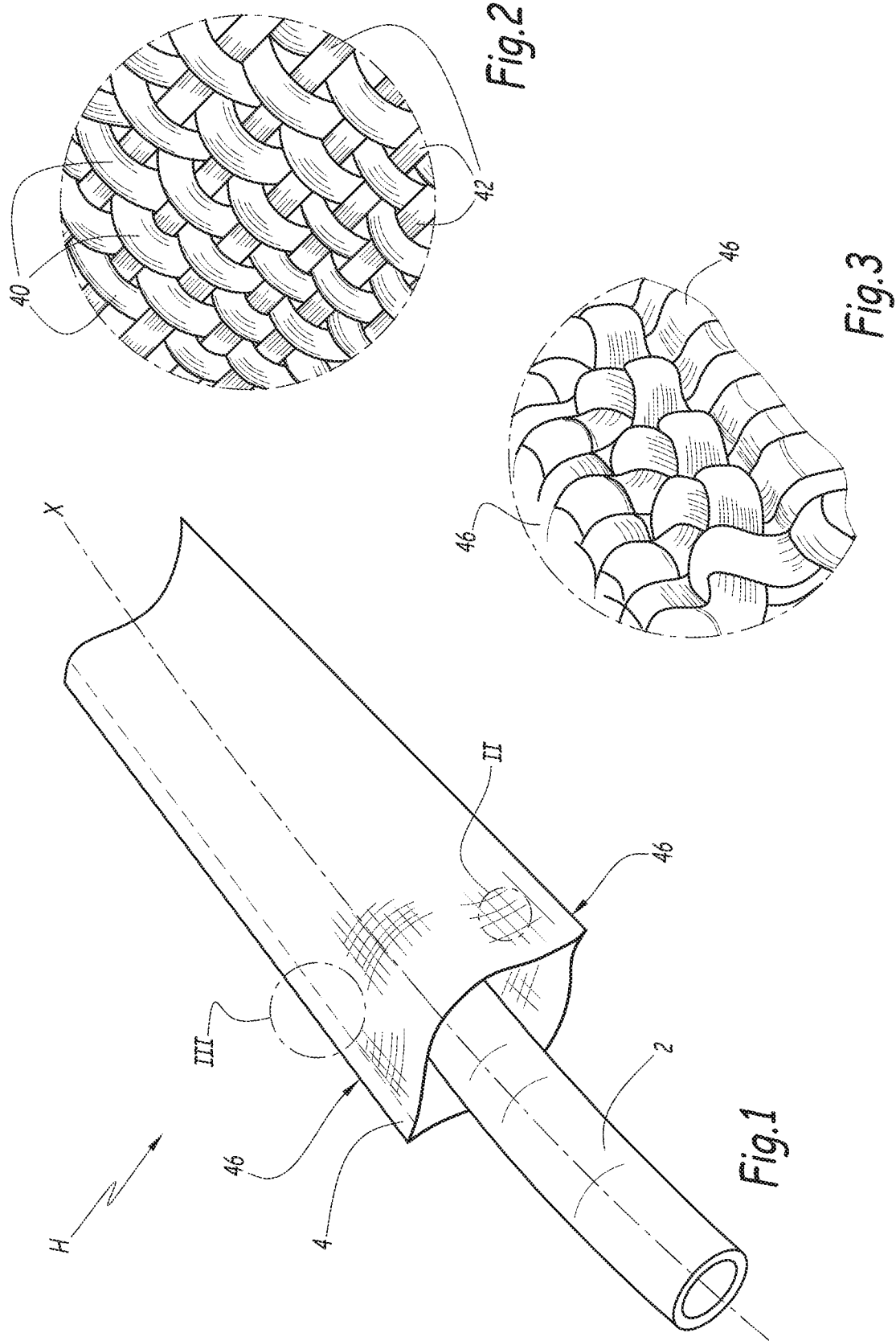

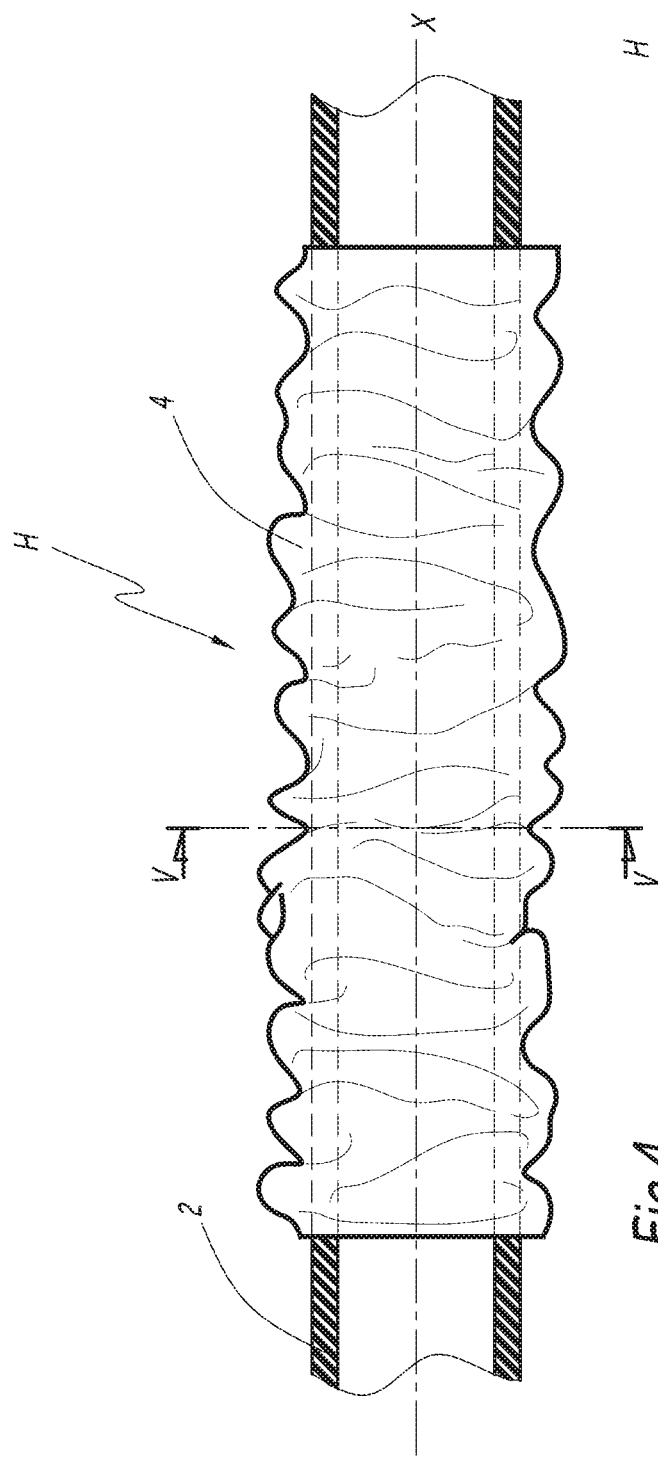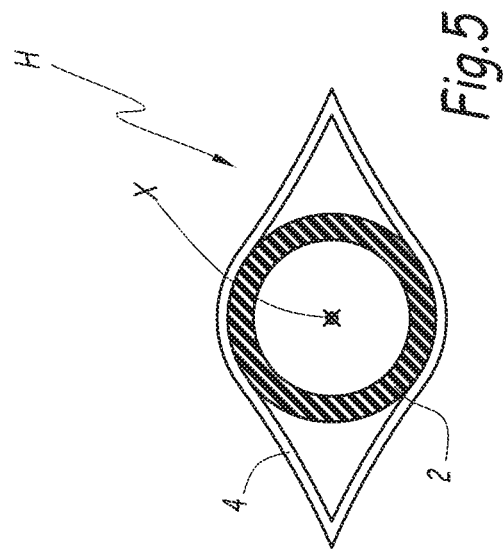

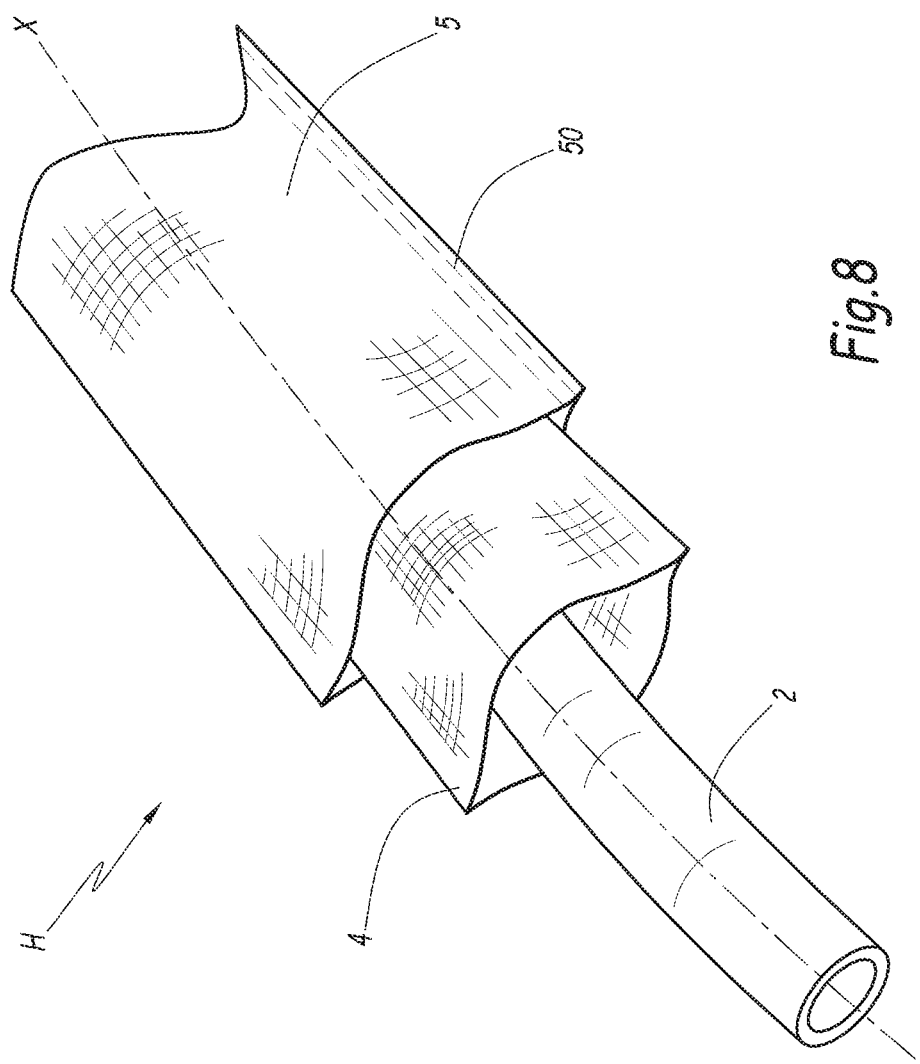

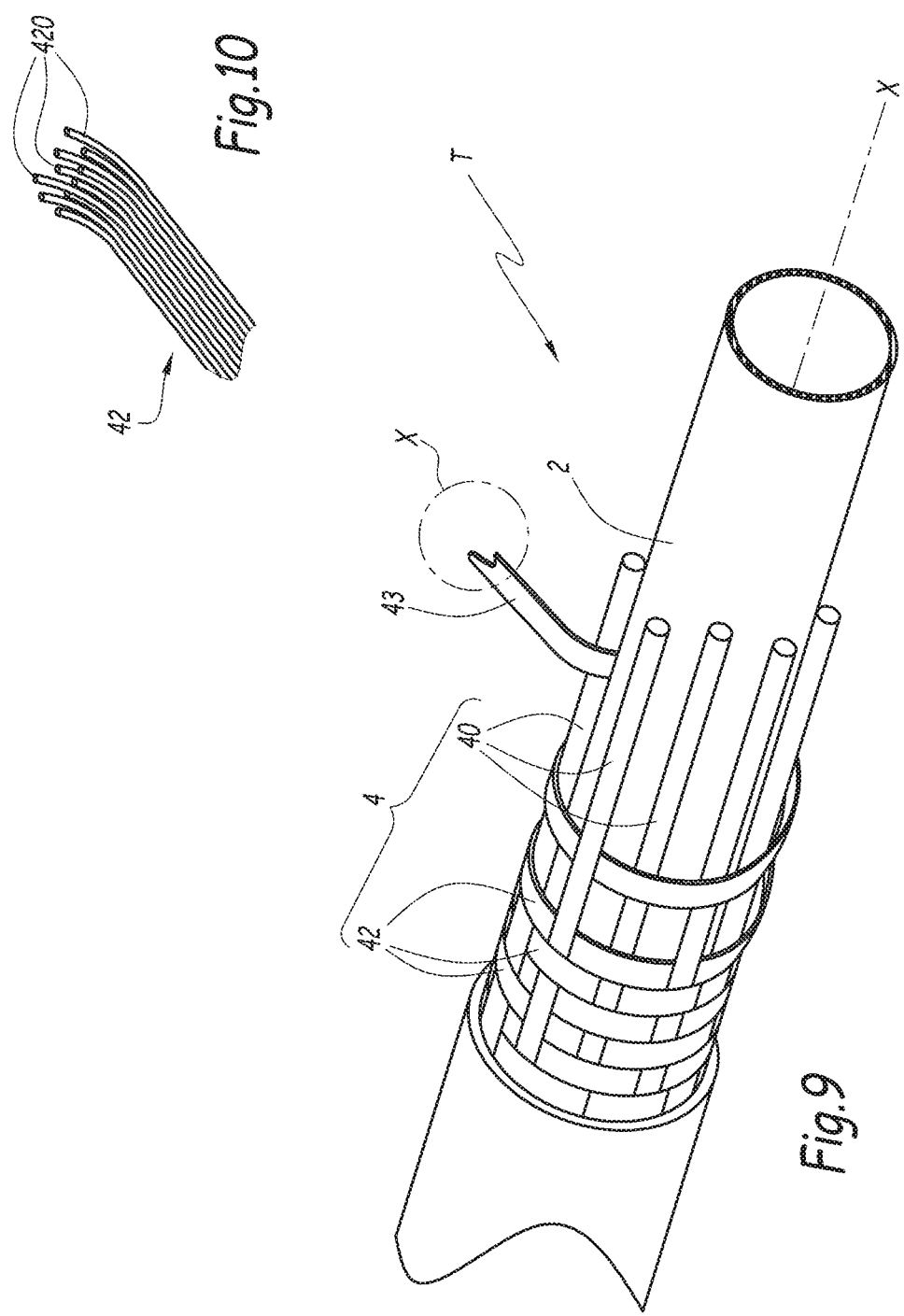

LAYER AND TUBE COMPRISING SUCH A LAYER

CROSS REFERENCE TO RELATED APPLICATIONS

This application is a national stage filing under section 371 of International Application No. PCT/EP2018/070560, filed on Jul. 30, 2018, published on Feb. 7, 2019 as WO 2019/025347 A1 which claims priority to French Patent Application No. 1757308, filed on Jul. 31, 2017. The entire disclosure of each application is hereby incorporated herein by reference.

BACKGROUND

The invention relates to a sleeve intended to be used for the construction of a pipe for the passage of a fluid, as well as a pipe comprising such a sleeve.

The word "sleeve" is understood to mean that this sleeve can form part of a pipe construction, that it may be a tube, a sleeve of a tube, a sheath, folded or welded. There may be a plurality of sleeves in the pipe construction. One sleeve may be connected to the other sleeve or partially connected to another sleeve or not connected to another sleeve.

Pipes intended to be used for the flow of fluid, such as hose pipes, may need to be of great length, which thereby increases the weight of the pipe when it is to wound up and put away. In order to reduce the weight and bulk of the pipe, there are known pipes which have properties of extension by means of which the pipe is elongated and enlarged when water flows within it. This ensures that the pipe has a sufficient pipe length and maintains a high flow rate and retracts when the flow of water within it is stopped. The retracted pipe is of lower weight and is less bulky, which facilitates transport and storage thereof after use.

Such a pipe comprises at least one sleeve of extendible synthetic material and a textile reinforcement. The disadvantage of this pipe is that the textile reinforcement used, which is a knitted fabric, tends to stretch across its diameter, which means that the pipe has a large mass per unit length.

These are the disadvantages which the invention aims to overcome by proposing a sleeve for the construction of a pipe, the sleeve offering improved performance with respect to the prior art.

SUMMARY OF THE INVENTION

To this effect, the invention relates to a sleeve for the construction of a garden hose pipe, this sleeve extending about a longitudinal axis. This sleeve is characterised in that it has greater elongation capacities in one direction than in the other with respect to the longitudinal axis.

According to advantageous but non-obligatory aspects of the invention, such a reinforcing sleeve can incorporate one or a plurality of the following features, taken into consideration according to any technically admissible combination:

The sleeve has an extendible construction.
The sleeve is composed of an extendible material.
The sleeve has greater elongation capacities in the direction of the longitudinal axis than in a direction perpendicular to the longitudinal axis.
The sleeve is composed of textile.
The sleeve is composed of a woven fabric centred on a longitudinal axis, the woven fabric comprising weft elements which are aligned circumferentially about the longitudinal axis and warp elements being aligned along the longitudinal axis.
At least one of the warp elements is extendible.
The at least one extendible warp element has an elongation capacity between 10% and 50% of its initial length and preferably between 25% and 50% of its initial length.
At least one of the warp elements is composed of nylon, elastane, Lycra.
The warp elements are chosen from among threads, covered threads, plies, strands and filaments.
The weft elements are not extendible.

BRIEF DESCRIPTION OF THE DRAWINGS

The invention also relates to a pipe intended to be used for the flow of fluid, comprising an internal sleeve of extendible material and a second sleeve as mentioned above, surrounding the internal sleeve.

According to advantageous but non-obligatory aspects of the invention, such a pipe can incorporate one or a plurality of the following features, taken into consideration according to any technically admissible combination:

In the absence of pressure, the second sleeve is corrugated around the internal sleeve.
The pipe further comprises an external sleeve also composed of an extendible material surrounding the second sleeve.
The internal and/or external sleeves are composed of SEBS or of latex or of TPE.

Figure 6:
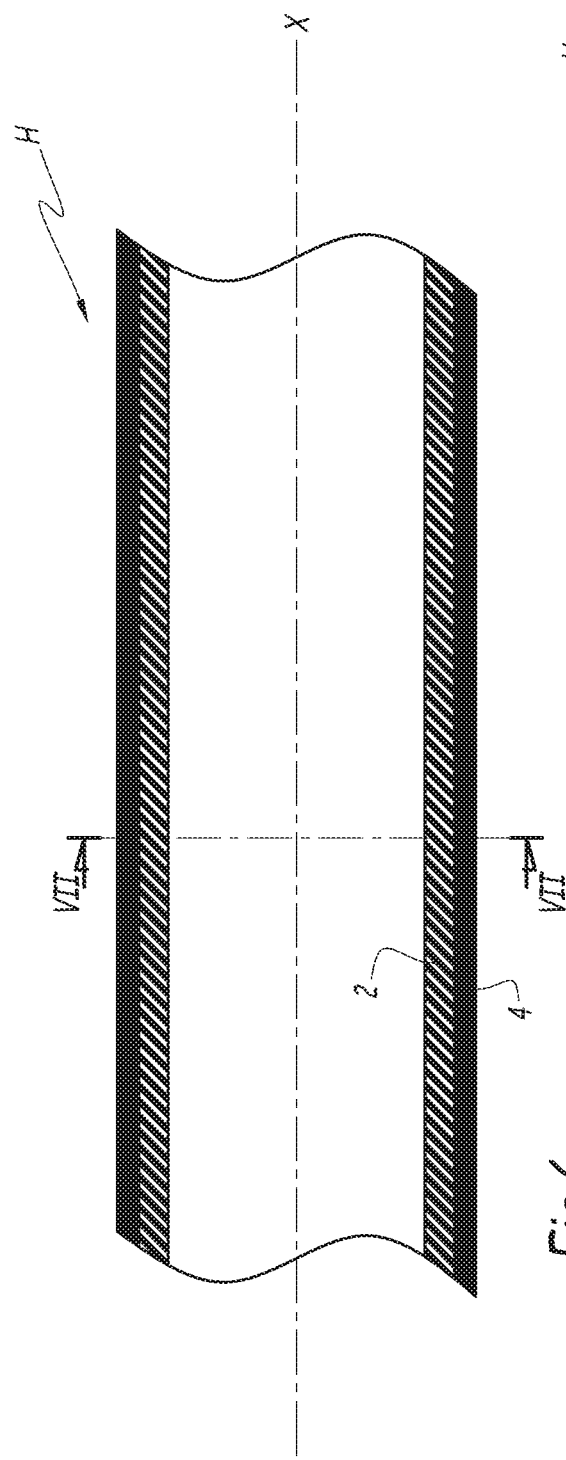
Figure 7:
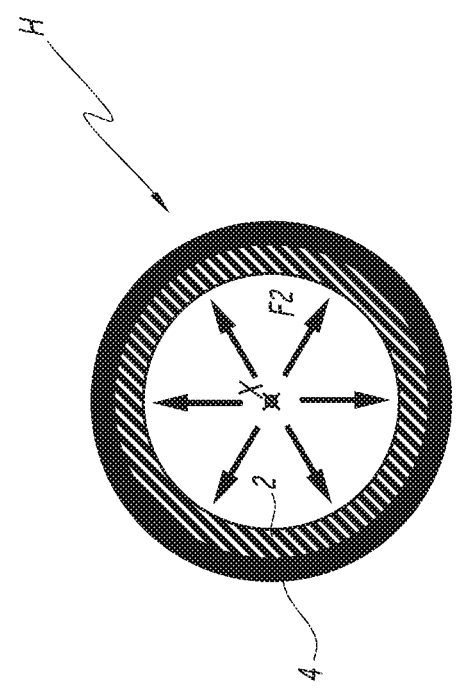

The invention will be better understood and other advantages thereof will become clearer in light of the following description of a sleeve and of a pipe in accordance with the principle thereof, made by way of non-limiting example and with reference to the attached drawings in which:

FIG. 1 is a perspective view of a part of a pipe in accordance with a first embodiment of the invention;

FIG. 2 is a view on a larger scale of the detail II of FIG. 1 of a sleeve of the pipe of FIG. 1;

FIG. 3 is a perspective view on a larger scale of the detail III of FIG. 1;

FIG. 4 is a side view of the pipe of FIG. 1 in a retracted state;

FIG. 5 is a cross-sectional view along the plane V-V of the pipe of FIG. 4;

FIG. 6 is a side view of the pipe of FIG. 4 under pressure;

FIG. 7 is a cross-sectional view along the plane VII-VII of the pipe of FIG. 6;

FIG. 8 is a perspective view of a part of a pipe in accordance with a second embodiment of the invention;

FIG. 9 is a perspective view of a part of a pipe in accordance with a third embodiment of the invention;

FIG. 10 is a view on a larger scale of the detail X illustrated in FIG. 9.

DETAILED DESCRIPTION

FIG. 1 illustrates a pipe H intended to be used for the flow of fluid, e.g. a hose pipe. The pipe H comprises a sleeve 4 which extends along a longitudinal axis X. The sleeve 4 is disposed radially around an internal sleeve 2 of the pipe H. The internal sleeve 2 is composed of an extendible natural material such as rubber or is produced from an extendible synthetic material, in particular a thermoplastic elastomeric material such as styrene-ethylene-butylene-styrene (SEBS).

The sleeve 4 is created in the form of a flat strip closed along its length by connection of the longitudinal edges 46 as shown in FIG. 3. For example, the edges 46 can be sewn by stitching, welding, ultrasonic welding, gluing, etc. The flat strip can be joined edge to edge or in an overlapping manner.

The word "sleeve" is understood to mean that this sleeve can be like a sheath around the internal sleeve. This sheath may be unconnected, connected or partially connected to the internal sleeve or to other sleeves.

According to another embodiment, not illustrated, the sleeve 4 may not be of a woven fabric, e.g. a net, a fibrous material, a knitted material, or another textile material comprising at least one longitudinally extending extendible element.

According to one embodiment, the sleeve 4 is composed of textile.

As shown in FIG. 2, the sleeve 4 produced of textile is composed of a woven fabric which comprises a warp composed of elements 40 which extend parallel to the longitudinal axis X. The woven fabric forming the sleeve 4 also comprises a weft composed of elements 42 which are circumferentially positioned about the longitudinal axis X.

At least one warp element 40 is extendible. "Extendible" is understood to mean that this warp element 40 has the capability of being stretched lengthwise and reversibly returning to its initial or nominal length, i.e. its length at rest, in the absence of traction forces. For example, the elongation capability of the warp element 40 can be between 10% and 50% of its initial length, more preferably between 25% and 50% of its initial length.

The warp elements 40 can be composed of threads as shown in the example, or, inter alia, of covered threads, of rovings of fibres or of laps, or of strands.

According to one example, the sleeve 4 can comprise extendible warp threads 40.

The weft elements 42 are non-extendible. "Non-extendible" is intended to mean that the elements 42 which constitute the weft cannot be stretched lengthwise, which corresponds to the circumferential direction of the pipe H. For example, the elongation capability of the elements 42 may be less than 1% of their initial length.

The weft elements 42 can be chosen from among threads, covered threads, plies, strands and filaments.

At least one warp element 40 is optionally non-extendible. This makes it possible to control the elongation of the sleeve 4. The warp 40 can comprise at least one extendible element and at least one non-extendible element, the length of the non-extendible element being similar in dimension to the desired elongation value of the sleeve 4.

At rest, which means in the absence of pressure, the sleeve 4 is initially retracted. The pipe H is retracted and has an undulating shape. The term "undulating" means that the sleeve 4 is "concertinaed" around the internal sleeve 2, which is straight (see FIG. 4). Under the action of the pressure of the water which elongates and enlarges the internal sleeve 2, as indicated by the arrows F1 and F2 in FIGS. 6 and 7, the sleeve 4 is deployed in order to extend, with an additional elongation capacity when its maximum length is reached so as to absorb potential shocks at high pressure.

The warp threads 40 and the weft threads 42 can be woven together in an alternating pattern, the weft threads 42 passing alternately above and below the warp threads 40.

At least one extendible element of the warp elements 40 is composed of at least one of the following: elastane, Lycra or nylon.

The elastic properties of nylon, elastane or Lycra permit the retraction of the pipe H in the absence of pressure exerted by a fluid and the return of the sleeve 4 to its nominal length.

The Applicant has discovered that the nylon thread of the warp had the advantage of increasing the resistance to wear and thus the lifespan of the pipe H in normal use. The term "normal use" designates the use of a domestic water pressure and e.g. a pressure between 1 and 10 bar.

By way of example, the nylon used can be of a mass per unit length between 200 and 800 denier.

The Applicant estimates that the pipe H can extend up to 10% of its nominal length or more during normal use, owing to the extension of the sleeve 4.

As a variation, the warp threads 40 can be produced of any other extendible synthetic material.

The elastic nature of the SEBS permits the elongation and retraction of the pipe H. This retraction is favoured by the elastic nature of the nylon, elastane or Lycra warp threads 40.

According to an optional aspect of the invention, the warp threads 40 may be covered. In this case, the treads 40 comprise an elastane core surrounded by a sheath which may be of e.g. non-extendible material such as polyethylene terephtalate (PET).

The non-extendible weft elements 42 are preferably produced of PET and/or of Kevlar and/or of aramide and/or of polyamide and/or bio-sourced or natural fibres such as linen or hemp fibres. As a variation, the weft elements 42 can also be produced of any other type of non-extendible material. By way of example, the weft elements 42 can have a mass per unit length of 5500 decitex, or a mass per unit length between 700 and 900 denier.

The warp and/or weft threads can be coated, e.g. with SEBS or with materials compatible with SEBS, such as styrene-based, ethylene-based or butylene-based materials of the family of styrenic thermoplastic elastomers (TPE-S) permitting gluing to another sleeve to be enhanced.

By way of example, the density of the weft elements 42 can be between 50 and 60 elements per inch of length along the longitudinal axis X.

FIG. 8 illustrates a second embodiment which differs from the embodiment of FIG. 1 in that an external sleeve 5 is added to the pipe H and surrounds the sleeve 4. In particular, this sleeve 5 is a protective sleeve of e.g. rubber or SEBS.

As illustrated, this additional sleeve 5 is initially a strip which is then folded in order to surround the sleeve 4. The strip is closed by a seam 50. Other means can be used to close the strip.

In one particular embodiment, this additional sleeve 5 is not connected to the sleeve 4 which it surrounds.

In other embodiments, this additional sleeve 5 is connected to the sleeve 4.

A third embodiment of the invention is illustrated in FIGS. 9 and 10. In this embodiment, the elements in common with the first embodiment have the same reference signs and function in the same manner.

FIG. 9 illustrates a pipe T intended to be used for the flow of fluid, in the manner of a hose pipe. As in the first embodiment, the pipe T comprises a sleeve 4, in this case referred as a "reinforcing sleeve" which extends along a longitudinal axis X. The reinforcing sleeve 4 is disposed radially between an internal sleeve 2 and an external sleeve 6 of the pipe T. The reinforcing sleeve 4 coaxially surrounds the internal sleeve 2. The internal sleeve 2 and the external sleeve 6 are each produced of an extendible synthetic material, in particular of a thermoplastic elastomeric material such as styrene-ethylene-butylene-styrene (SEBS).

The external sleeve 6 gives the pipe T its outer appearance and makes it resistant to abrasion and provides it with a washable external surface. The thickness of the external sleeve 6 can be of the order of e.g. 1 mm for a pipe with an inner diameter of 10.5 mm and an outer diameter of 15 mm.

In the example illustrated, the reinforcing sleeve 4, and the pipe T in its entirety, are of a tubular shape centred on the axis X. In a variation which is not illustrated, the reinforcing sleeve 4 can be of a partially flattened shape. In such a case, the pipe T can have e.g. a thickness of the order of 6 mm and a width between 18 and 22 mm, the internal sleeve 2 and the external sleeve 6 having a thickness of the order of 2.25 mm.

Furthermore, the internal and external sleeves 2 and 6 are merged at points at regular intervals over the whole length of the pipe T. The merging is effected through punctiform orifices 45, i.e. radial openings provided in the reinforcing sleeve 4 permitting the material of the internal sleeve 2 and external sleeve 6 to merge through the orifices to form punctiform material links between the internal sleeve 2 and external sleeve 6. This makes it possible to avoid a portion of the internal sleeve 2—in the event that it is ruptured —retracting inside the reinforcing sleeve 4 and being irretrievable therefrom, while the external sleeve 6, remaining stretched, causes permanent damage to the pipe T. As a variation, the interval at which the links are distributed is not necessarily regular.

As a variation, this punctiform merging is effected only at the two ends of the pipe T.

In the example illustrated in FIGS. 9 and 10, the weft elements 42 are strips. The term "strips" is understood to mean that each weft strip has a width, i.e. a dimension along the longitudinal axis X which is greater than the thickness of the strips in the radial direction of the pipe T. The strips constituting the weft elements 42 can also be referred to as ribbons or rovings of fibres/laps, these terms covering the same dimensional features of width and thickness.

As shown in FIG. 10, the strips 42 are formed by a large number of threads, or filaments, 420 grouped together side by side and laid flat.

The weft elements 42 can also be composed, inter alia, of threads, covered threads or strands.

According to an optional embodiment, the strips 42 forming the weft are formed of a continuous ribbon 43, illustrated in FIG. 9, woven helically with the warp threads 40. In other words, the weft strips 42 are not formed by independent strips discontinuous at each end, as is the case on a non-cylindrical fabric part, but by a single continuous strip wound about the central axis X of the pipe T.

The pipe T is manufactured according to a method comprising the successive steps consisting of: a) extruding the internal sleeve 2, b) weaving the reinforcing sleeve surrounding the internal sleeve 2, and finally c) extruding the external sleeve 6 around the reinforcing sleeve 4.

The external sleeve 6 preferably adheres to the reinforcing sleeve 4. In order to do so, the strips 42 forming the weft are structured so as to increase the coefficient of friction between the reinforcing sleeve 4 and the external sleeve 6. This can be achieved e.g. by selecting the properties of the PET forming the weft strips 42 or by adopting a particular type of weaving such as a canvas type weave.

The reinforcing sleeve 4 and the external sleeve 6 are advantageously stuck to each other.

According to an optional aspect of the invention, the diameter of the warp threads 40 can be increased, in particular by increasing the quantity of elastane per length of thread, which makes it possible to increase the elongation capability of the pipe T.

According to one embodiment of the invention, not illustrated, the weft threads 42 can be formed by a twisted strip. In such a case, the creep of the materials of the internal and external sleeves 2 and 6 through the reinforcing sleeve 4 is promoted.

According to one optional aspect, the reinforcing sleeve 4 can be formed by a double-thickness woven fabric, including an extendible internal thickness and an external thickness acting as a protection sleeve.

According to another embodiment, not illustrated, the external sleeve 6 can also be produced of a textile and not of an extruded synthetic material. For example, the textile external sleeve can assume the appearance of a jacket.

According to another embodiment, not illustrated, only the internal sleeve 2 can be fixedly attached to the reinforcing sleeve 4, or only the external sleeve 6 can be fixedly attached to the reinforcing sleeve 4.

According to another embodiment, not illustrated, the reinforcing sleeve 4 may not be of a woven fabric, e.g. a net, a fibrous material, a knitted material, or another textile material comprising at least one longitudinally extending extendible element.

More generally, the sleeve 4 has greater elongation capacities in one direction than the other with respect to the longitudinal axis X. In other words, the reinforcing sleeve 4 has the capability of being stretched in length and, in the absence of traction forces, reversibly returning to its initial or nominal length, i.e. its length at rest, which is greater in either the longitudinal direction, along the longitudinal axis X, or transverse direction, perpendicular to the longitudinal axis X, than in the other of these directions.

In the illustrated example, and in a preferential manner, the reinforcing sleeve 4 has an elongation capacity which is greater in the longitudinal direction than in the transverse direction, i.e. the capability of being stretched in length and reversibly returning to its initial or nominal length, which is greater along the longitudinal axis X than perpendicularly to the longitudinal axis X.

The reinforcing sleeve 4 can be of an extendible construction, i.e. one in which the elongation differentiated according to the direction is permitted by its structure and by the manner in which it is produced from the raw material. For example, it may be a stitch construction, e.g. a net, of which the stitches have axial dimensions different from the transverse directions. A net of this type can be produced by extrusion.

As a variation, the reinforcing sleeve 4 can be produced of extendible material, i.e. the elongation differentiated according to the direction is permitted by the composition of the material used for manufacture thereof. In this case, the reinforcing sleeve can be e.g. a net produced of elastic material.

According to another embodiment, not illustrated, the sleeve 4 can be composed of a material which is dimensionally fixed and of a flexible tubular fabric.

The features of the embodiments and variations described above can be combined in order to form new embodiments of the invention.

The invention claimed is:

1. A sleeve intended for the construction of a hose pipe, this sleeve extending about a longitudinal axis, and said sleeve having greater elongation capacities in one direction than in an opposite direction with respect to the longitudinal axis, wherein the sleeve is composed of a woven fabric centered on the longitudinal axis, the woven fabric comprising weft elements which are aligned circumferentially about the longitudinal axis and warp elements which are aligned along the longitudinal axis, and wherein at least one of the warm elements is extendible.

2. The sleeve as claimed in claim 1, wherein the sleeve is of extendible construction.

3. The sleeve as claimed in claim 1, wherein that the sleeve is composed of an extendible material.

4. The sleeve as claimed in claim 1, wherein the sleeve has greater elongation capacities in the direction of the longitudinal axis than in a direction perpendicular to the longitudinal axis.

5. The sleeve as claimed in claim 1, wherein the at least one extendible element of the warp has an elongation capacity between 10% and 50% of an initial length thereof.

6. The sleeve as claimed in claim 1, wherein at least one of the elements of the warp is composed of nylon or elastane.

7. The sleeve as claimed in claim 1, wherein the warp elements are selected from threads, covered threads, plies, strands and filaments.

8. The sleeve as claimed in claim 1, wherein the weft elements are non-extendible.

9. A pipe comprising:
an internal sleeve of extendible material,
a second sleeve surrounding the internal sleeve, the second sleeve being intended for the construction of a hose pipe and this sleeve extending about a longitudinal axis, and said second sleeve having greater elongation capacities in one direction than in an opposite direction with respect to the longitudinal axis.

10. The pipe as claimed in claim 9, wherein in an absence of pressure, the second sleeve is corrugated around the internal sleeve.

11. The pipe as claimed in claim 9, which further comprises an external sleeve also composed of an extendible material surrounding the second sleeve.

12. The pipe as claimed in claim 9, wherein the internal sleeve and/or external sleeve is/are composed of SEBS or of latex or of TPE.

13. The pipe as claimed in claim 11 in which the second sleeve is a reinforcing sleeve having punctiform orifices through which material of the internal sleeve and external sleeve merge to form punctiform material links between the internal sleeve and external sleeve.

14. A sleeve intended for the construction of a hose pipe, this sleeve extending about a longitudinal axis, and said sleeve having greater elongation capacities in one direction, which one direction is one of transverse to the longitudinal axis and parallel to the longitudinal direction, than in an opposite direction, which opposite direction is the other of transverse to the longitudinal axis and parallel to the longitudinal direction, wherein the sleeve is composed of a woven fabric centered on the longitudinal axis, the woven fabric comprising weft elements which are aligned circumferentially about the longitudinal axis and warp elements which are aligned along the longitudinal axis, and wherein the weft elements are non-extendible.

15. The sleeve as claimed in claim 1, wherein the at least one extendible element of the warp has an elongation capacity between 25% and 50% of its initial length.

* * * * *